(No Model.)
G. D. CHAMBERLAIN.
TIRE FOR VELOCIPEDE WHEELS.
No. 490,425. Patented Jan. 24, 1893.
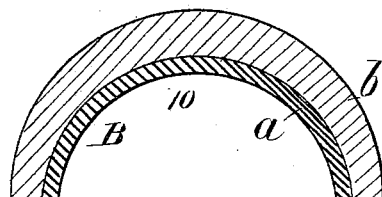
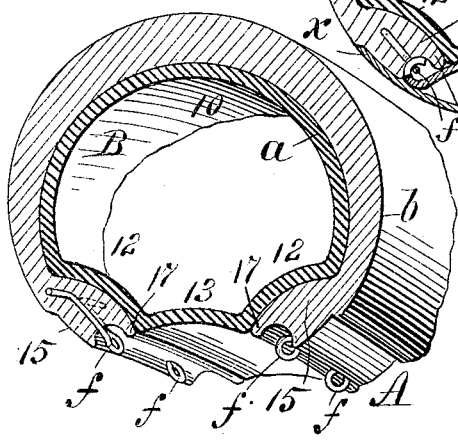
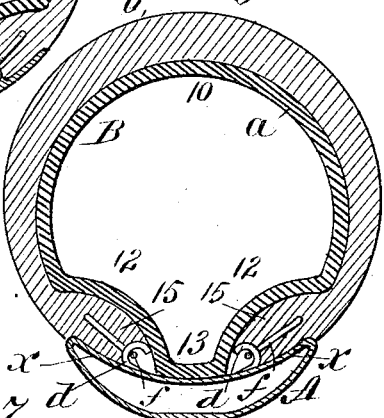
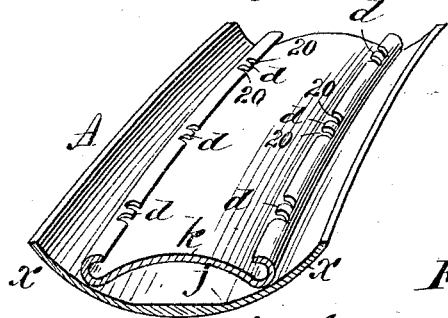
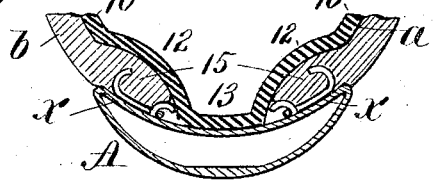
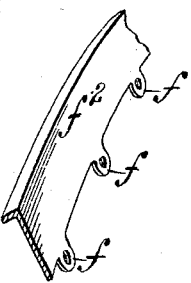
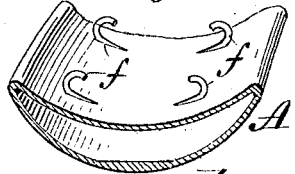
Witnesses
J. N. Garfield.
K. I. Clemons
Inventor:
Geo. D. Chamberlain,
per Chapin & Co. Attys.

UNITED STATES PATENT OFFICE.

GEORGE D. CHAMBERLAIN, OF SPRINGFIELD, MASSACHUSETTS, ASSIGNOR TO THE WARWICK CYCLE MANUFACTURING COMPANY, OF SAME PLACE.

TIRE FOR VELOCIPEDE-WHEELS.

SPECIFICATION forming part of Letters Patent No. 490,425, dated January 24, 1893.

Application filed August 10, 1892. Serial No. 442,678. (No model.)

*To all whom it may concern:*

Be it known that I, GEORGE D. CHAMBERLAIN, a citizen of the United States, residing at Springfield, in the county of Hampden and State of Massachusetts, have invented new and useful Improvements in Rims and Tires for Velocipede-Wheels, of which the following is a specification.

This invention relates to improvements in velocipede wheels having pneumatic tires.

The objects of the invention are to provide such an improved construction of tire and rim that the tire may be easily attached and detached from the rim, inducing facility in the original construction and assemblage, and also in repairing; and to devise a form of pneumatic tire wherein the abrasive action at its place of support and connection at and near the edges of the rim will be prevented.

To these ends the invention consists in constructions and combinations of parts all substantially as will hereinafter fully appear and be covered by the claims.

In the accompanying drawings examples of my improved rim and tire are shown, Figure 1 being a cross sectional view of the preferred form of the parts. Fig. 2 is a cross sectional and perspective view of the tire detached from the rim,—Fig. 3 being a cross sectional and perspective view of the rim. Figs. 4, 5, and 9 are views showing the various forms of devices which may be vulcanized into or upon the tire covering to constitute the attachment eyes thereof. Figs. 6 and 7 are similar views to Fig. 1 but showing slight structural differences to be hereinafter referred to. Fig. 8 is a cross sectional view of the rim of the construction comprised in said Figs. 6 and 7.

In the drawings, A represents the rim and B represents the tire regarded as a whole, the latter comprising the air tube, $a$, and the covering, $b$. The tire is connected to the rim by the engagement of the eyes on one with hooks on the other. The hooks are preferably provided on the inner wall of the rim; and a hollow rim is preferably employed, although a hollow or double walled rim is not a necessity. The hooks, $d$, are arranged in longitudinal series within the edges of the rim, so that outwardly beyond them are the rests, $x$, $x$, for the tire covering. The air-tube of the tire has its inner or base portion contracted so as to lie on the rim entirely between the opposite series of hooks. The specific form of air-ring which I would have understood as the preferred one, (but to the exact contour of which I do not desire to be limited) is that shown in the drawings wherein the outer portion, 10, of the wall is in the form of a rounded arch, the base portions inwardly converging in the exteriorly concave sections, 12, 12, and united by the narrow transverse section, 13. And the specific preferred form of the tread or covering, $b$, is seen in a strip which may be transversely curved around to embrace the outer and lateral side of air-tube, and which is thickened inwardly so as to have the lobes, 15, fill the space between the edge rests, $x$, of the rim and the inclined sections, 12, of the air-tube. The eyes, $f$, $f$, are firmly connected to the lobed portions of the tire-covering, and project beyond the edgewise surface thereof to engage the hooks, $d$, $d$, on the rim in such a manner that inflation of and outward pressure by the pneumatic tire will perfect and render taut the connection. The eyes, $f$, may be formed of bent wire, as seen in Figs. 2, 4, 7 and 9, or they may be constituted by perforated lugs which are edge extensions of a plate, $f^2$, of sheet metal. The tangs or shank portions of these eyes may be incorporated or embedded within the tire section, $b$, at the time of vulcanization, or as seen in Fig. 2, they may lie along the surfaces of the section which are supported on the rests, $x$, the eyes projecting slightly beyond the corners.

It will be noted in Fig. 1 that the lobes, 15, of the outer tire section, $b$, have the inwardly projected curved ribs or lips, 17, which overlie the hooked portions of the rim, standing as guards between the latter and the air-tube sections, 15, 15, for the protection of these sections against any possible abrasive effect thereon by the hooks during the use of the tire on a bicycle wheel.

In Figs. 1 and 3 it will be observed that the rim consists of an outer main section, $j$, transversely of arc or shallow trough form, and the secondary narrower section, $k$, of reversed arc form with the edges upwardly and inwardly turned from the longitudinal lines of support on and within the edges of the main section. These upwardly and inwardly turned edge portions of the section, k, are recessed at suitable intervals as seen at 20, 20, to form therebetween the hooks, d, d.

The hollow rim may be made in the form shown in Figs. 6, 7, and 9, when it is possible to construct it from a single blank of sheet metal as well known. For this form of rim the hooks may be separately formed and secured by brazing or otherwise.

The outer tire covering, b, is intended to be of india rubber in any of its elastic vulcanizable compounds, and may or may not be cemented to the air-tube as desired.

The tire is capable of being readily detached and attached while partially or wholly deflated; and when in use the edge lobes, 15, of the said outer covering section effectually cushion the adjacent portions of the air-tube which are opposite the edges of the tire, and which portions have heretofore been found most liable to break open. The outer cover section may be thickened at the tread, as shown, or may be of any desired form and dimensions.

I claim:—

1. The combination with a rim having between its one edge and center longitudinal line a longitudinally arranged series of separated hooks, of a pneumatic tire comprising an air-tube of suitable cross sectional form but having the walls thereof at each underside convergent toward the median longitudinal line at the inner periphery of the air-tube whereby the base thereof is so narrowed that it has its support only upon the middle portion of the rim, and a section which covers the tread and sides and has a seat at its opposite edges on the rim outside of the air-ring base one edge being suitably connected to the rim, the said cover section being provided at its other edge with a series of eyes to engage said hooks, for the purpose set forth.

2. The combination with a rim having between its opposite edges and its center two series of longitudinally arranged hooks, of a pneumatic tire comprising an air-tube of suitable cross-sectional form but having the walls thereof at each under side convergent toward the median longitudinal line at the inner periphery of the air-tube whereby the base thereof is so narrowed that it may have its seat upon the rim wholly between the two rows of intermediately arranged hooks, and the section which covers the tread and sides and has a seat at opposite edges on the rim outside of the air-ring base and provided with a series of eyes to engage said hooks, substantially as and for the purpose set forth.

3. The combination with a rim having between its opposite edges and its center two series of longitudinally arranged hooks, of a pneumatic tire comprising an air-tube of suitable cross-sectional form but having the walls thereof at each under side convergent toward the median longitudinal line at the inner periphery of the air-tube whereby the base thereof is so narrowed that it may have its seat upon the rim wholly between the two rows of intermediately arranged hooks, and the section which covers the tread and sides which has its edge portions thickened and has a seat at opposite edges on the rim outside of the air-ring base and provided with a series of eyes to engage said hooks, substantially as and for the purpose set forth.

4. The combination with a rim of an air-tube having an arch shaped top, 10, with a base formed by converging sections, 12, 12, with a narrow uniting section, 13, to rest centrally on the rim, and an elastic covering for the air-tube having the thickened edge-portions or lobes, 15, 15, which lie between the marginal sections of the rim and said sections, 12, 12, and are secured to the rim, substantially as described.

5. A rim for a bicycle wheel consisting of a main or outer section, j, of trough or arc shape, and the secondary narrower section, k, of reversed arc form with the edge portions upwardly and inwardly turned from the longitudinal lines of support on the main section and having the openings formed therein from the edges to constitute therebetween the hooks, substantially as described.

6. A rim for a velocipede wheel consisting of a main or outer section, a, transversely of arc or trough form and the secondary section of reversed arc-form supported within the borders of the main section whereby the outlying portions of the main section constitute marginal tire supports and said secondary section having edge portions thereof upwardly and inwardly extended to constitute longitudinal series of hooks, in combination with a tire comprising an air-ring with a narrowed base resting between the hooks, and the covering having its edge-portions resting on said marginal supports and forming elastic base supports under each side of the air-ring, substantially as set forth.

7. The combination with the rim having edge rests as x, and hooks therewithin, of the tire comprising the air-tube, a narrowed base to rest on the rim within the space between the hooks and the outer covering having the eyes to engage said hooks and provided with the edge lobes, 15, 15, to lie upon and between said edge rests, x, and the portions of the air-tube which are next to the rim-supported part, with the inwardly extended lips, 17, 17, to overlie the hooks, substantially as and for the purpose set forth.

GEO. D. CHAMBERLAIN.

Witnesses:
H. A. CHAPIN,
W. S. BELLOWS.